Dec. 26, 1944.    C. M. WARE    2,365,735
SCALE
Filed Nov. 7, 1942
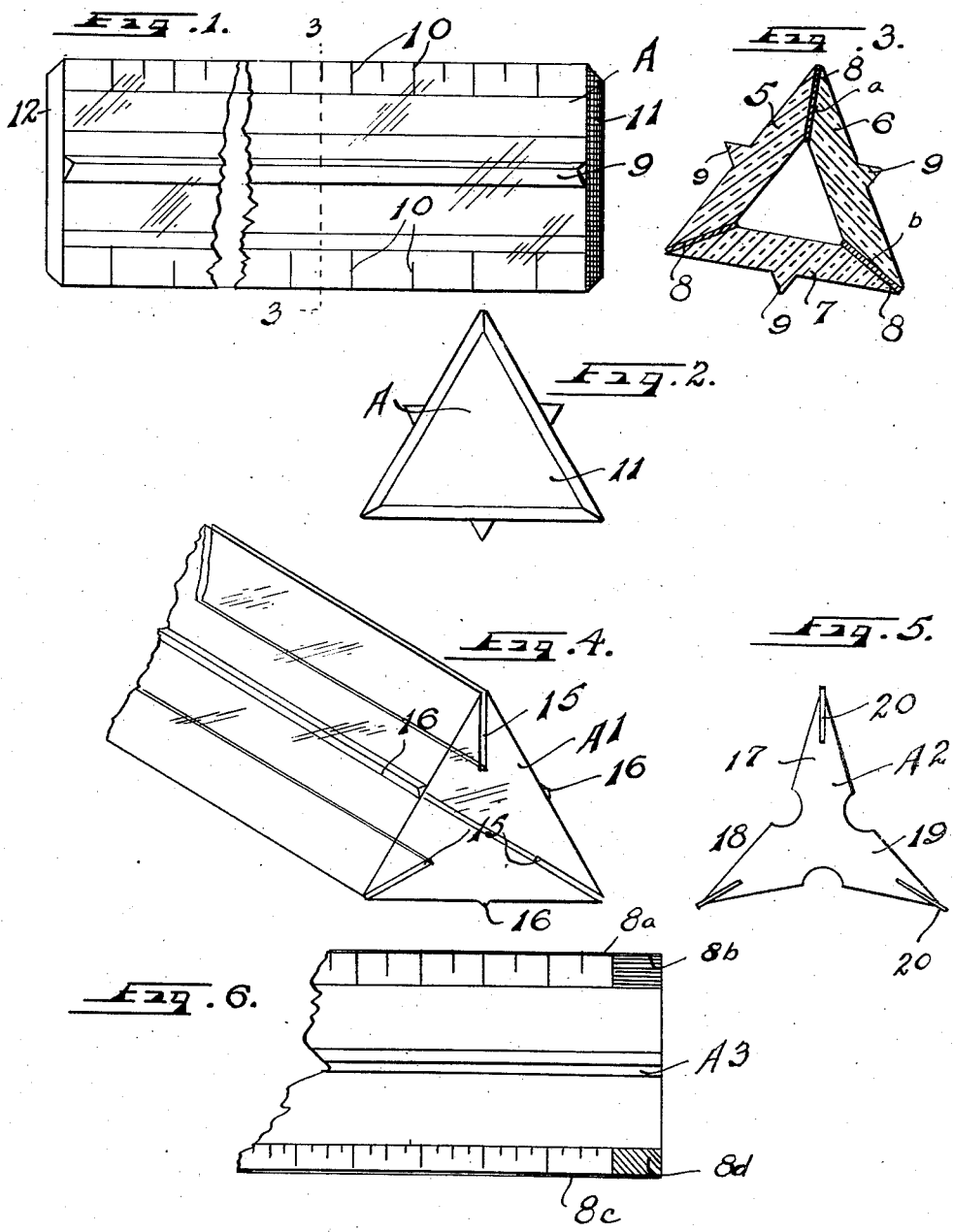
Inventor
Charles M. Ware
By R. M. Thomas
Attorney / Patented Dec. 26, 1944

2,365,735

UNITED STATES PATENT OFFICE 2,365,735

SCALE

Charles M. Ware, Salt Lake City, Utah

Application November 7, 1942, Serial No. 464,917

2 Claims. (Cl. 33—107)

My invention relates to measuring scales and has for its object to provide a new and highly efficient scale for draftsman and others using a scale which may be absolutely perfect in design and accurate in measurement.

A further object is to provide a scale formed of a transparent or opaque material plastic in nature and having each angle of a triangular scale formed with a bifurcating bisecting slot with the indicia marked on the outer surface of the scale and with a strip of opaque material carried in the slot to make the indicia visible from that side of the scale being viewed by the user, and of necessity each side of the scale must be provided with a raised longitudinal ridge to raise the side of the scale from the work thereby protecting the indicia from being worn away with continued use.

A still further object is to provide a scale of plastic material having one or both edges provided with a slot along the edge and carrying a strip of opaque material therein, with the indicia marked on the surface of the plastic material, and having a longitudinal central elevated ridge to protect the indicia from being worn.

A still further object is to provide a multiple scale having distinguishing markings on each end thereof of different colors so that the draftsman can tell just which scale he was using and wishes to continue using without wasting time to look at the indicia.

A still further object of the invention is to provide a scale which is neither concave or flat but which in essence is convex in principle and which is accomplished by the use of a longitudinally raised ridge medially of the scale body which will raise the indicia from contact with the working surface protecting it from wear.

A still further object is to provide a transparent scale having the indicia printed on the surface and having an opaque insert to bring out the indicia clearly to the user and prevent viewing of the other indicia on the opposite side thereof.

In the drawing in which I have shown my invention

Figure 1 is a side elevation of my improved scale.

Figure 2 is an end view thereof.

Figure 3 is a section on line 3—3 of Figure 1.

Figure 4 is a perspective view of a scale in which the body of the scale is cast or extruded into a solid one piece of plastic material with longitudinal slots bisecting each angle in which slots the opaque strips are set.

Figure 5 is an end view of a modified form of scale in which the opaque strips touch the surface of the board and take all the wear.

Figure 6 is a side view of a modified form of scale in which different colored ends are made to designate the scale being used.

In the drawing in Figure 1 I have shown the scale as A, made of a plastic material cut in three identical pieces 5, 6 and 7, all being formed of flat strips having the inside longitudinal edges beveled at $a$ and $b$, to fit against opaque parting strips 8, and all secured together to form the triangular scale A. Medially along each outside face of each strip I provide a raised central support ridge or rib 9, all of which are alike and so medially spaced that the scale when assembled and in use is pivoted on one of the ribs and along one longitudinal edge. The main essential feature of this particular form of scale is the ease of reading the indicia 10 which is printed on the outer surface of each strip, 5, 6 and 7 along each edge thereof so that the indicia is as close to the work as possible.

The drawing shows the parting strip 8 made of opaque material and exaggerated in thickness but in reality this strip will be very thin and only provided so that the user of the scale will not see the indicia on the opposite side of the scale but only that which is directly before his eyes, for without the strip if the scale is made of transparent plastic the user would see the scale on the other side of the scale.

Each scale when finished and secured together is provided with an end closure plate for each end thereof, and which plate will be made of different colors, one color at each end. These plates 11 and 12 are shown as black and white respectively however any assembly of colors may be utilized as desired the main essential feature being that they are made of different colors.

In Figure 4 I have shown a modified form of scale in which the entire scale is made by extruding a solid body A1 of transparent material, of plastic nature and formed as a triangular scale. Each edge is provided with a raised rib 16 and each angle or corner is bisected by a longitudinal very thin slot 15.

Into this slot the opaque strips are inserted and secured, and the indicia is printed on the outer surface of the body A1 as in Figure 1.

In Figure 5 I have shown a still further modified form of scale in which each side is formed as a small based triangular portion or a three pointed member A2, having the points 17, 18, and 19 so formed that the sides are substantially concave or formed so that they slant inwardly to meet at a medial arc. The ends of each point is bifurcated by a slot in which an opaque strip 20 is inserted. The indicia in this type of scale is printed on the outer surface of the points adjacent the opaque strip and also extending out over the surface of the opaque strip so that the indicia will always be adjacent the work.

In Figure 6 I have shown a modification in which the ends of the opaque strips 8a and 8c are shown as colored areas 8b and 8d, so that when used any given scale can be instantly recognized by the color of the end nearest the right hand of the user.

Having thus described my invention I desire to secure by Letters Patent and claim:

1. A scale of the class described comprising a scale formed of identical flat elongated transparent strips of plastic material having their inner edges beveled and fit together to form a triangular scale; and opaque parting strips in each joint to prevent interference in reading indicia through the scale when it has been printed on the outer surface of each strip.

2. A scale as set out in claim 1 including an end for each open end of said scale each end being made of a different color to indicate to the user what scale is or has been in use.

CHARLES M. WARE.